LA VERNE W. NOYES.
POWER TRANSMISSION MECHANISM.
APPLICATION FILED OCT. 7, 1914.
1,163,680.
Patented Dec. 14, 1915.
2 SHEETS—SHEET 1.
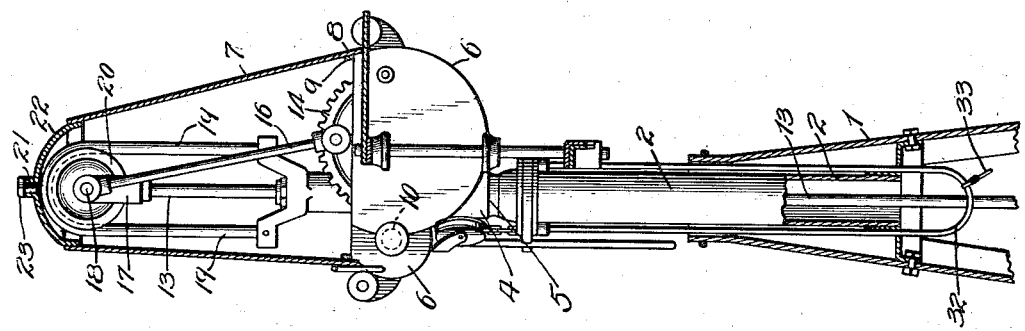
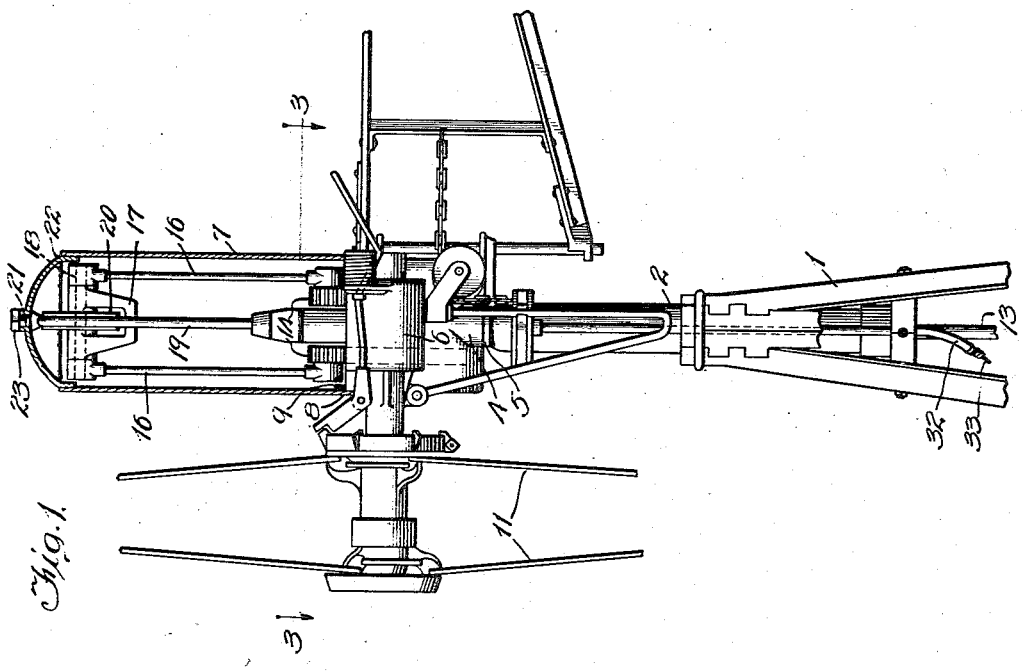
Witnesses
Inventor:
La Verne W. Noyes
By
Atty.

LA VERNE W. NOYES.
POWER TRANSMISSION MECHANISM.
APPLICATION FILED OCT. 7, 1914.
1,163,680.
Patented Dec. 14, 1915.
2 SHEETS—SHEET 2.
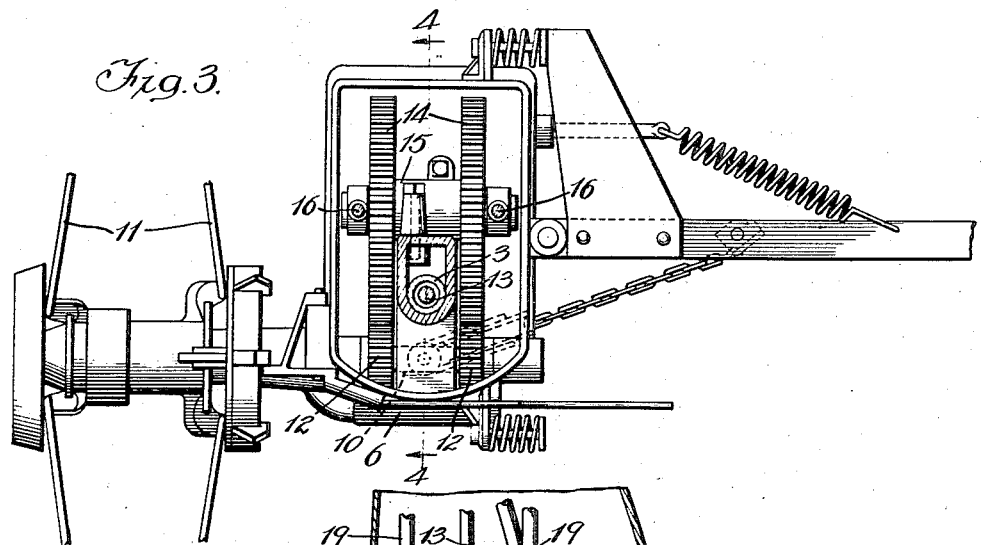
Fig. 3.
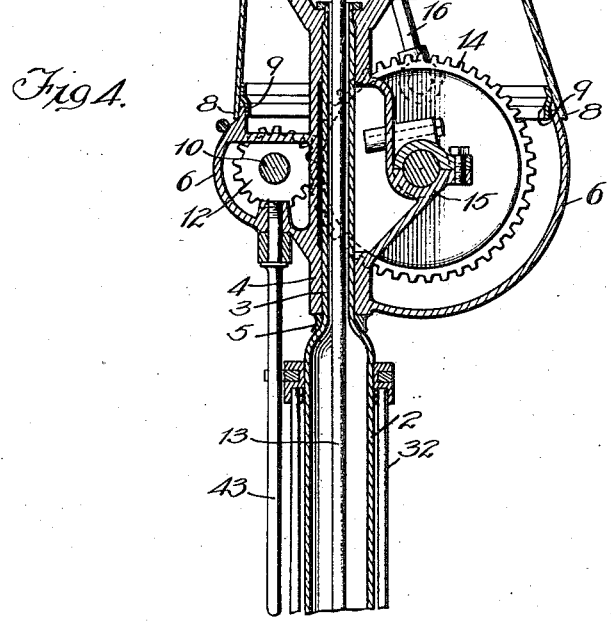
Fig. 4.
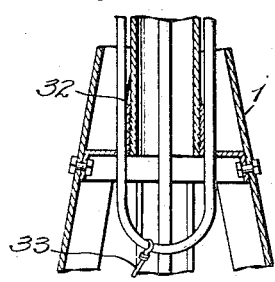
Witnesses:
K. G. Barrett
Ja. P. Perry
Inventor:
La Verne W. Noyes
By G. L. Gragg
Atty.

UNITED STATES PATENT OFFICE.

LA VERNE W. NOYES, OF CHICAGO, ILLINOIS, ASSIGNOR TO AERMOTOR COMPANY, OF CHICAGO, ILLINOIS, A CORPORATION OF ILLINOIS.

POWER-TRANSMISSION MECHANISM.

1,163,680.  Specification of Letters Patent.  Patented Dec. 14, 1915.

Original application filed April 9, 1914, Serial No. 830,627. Divided and this application filed October 7, 1914. Serial No. 865,451.

*To all whom it may concern:*

Be it known that I, LA VERNE W. NOYES, citizen of the United States, residing at Chicago, in the county of Cook and State of Illinois, have invented a certain new and useful Improvement in Power-Transmission Mechanism, of which the following is a full, clear, concise, and exact description, reference being had to the accompanying drawings, forming a part of this specification, this application being a division of my original application Serial No. 830,627, filed April 9, 1914.

My invention relates to power transmission mechanism and finds particular service when embodied in a wind mill structure, though the invention is not to be limited to such embodiment, there being shown an embodiment of this sort in my co-pending application Serial No. 830,627, filed April 9, 1914, of which the present application is a division.

My invention relates particularly to that class of power transmission mechanisms employing an upright reciprocable load rod, motor driven gearing for operating the same, and pitmen interposed between the motor driven gearing and the upper end of the load rod for transmitting actuating power to the latter.

The invention has for its general object the provision of improved means for directing the movement of the pitman structure where it is connected with the load rod and in practising this feature of my invention I preferably employ a pair of upright guides and a guiding roller operating between the guides and located where the pitman structure has connection with the load rod. The roller may have contact with either of the upright guides to be guided thereby, the guides being sufficiently spaced apart to enable the roller to have rolling action upon but one of the guides at a time.

I will explain my invention more fully by reference to the accompanying drawing showing the preferred embodiment thereof as employed in a wind mill structure and in which drawing—

Figure 1 shows portions of the upper part of a wind mill structure, some of these portions being shown in section; Fig. 2 is a side view of the structure illustrated in Fig. 1, some parts being shown in section; Fig. 3 is a plan view on line 3 3 of Fig. 1; and Fig. 4 is an elevation partially in section.

Like parts are indicated by similar characters of reference throughout the different figures.

The wind mill, in which the invention finds a very useful embodiment, is provided with a tower 1 that terminates in an upright stationary tubular column 2 whose reduced upper end constitutes an upright shaft 3 affording an upright axis about which the wind mill head 4 may turn upon a step bearing ring 5 supported upon the lower column portion. The head 4 is enlarged into an oil chamber 6 that may contain lubricant for the gearing. A chamber closing hood 7 has sheds 8 and 9 between which the chamber rim is received and which respectively prevent entrance of water and the exit of oil at said rim. The motor shaft 10 of the wind wheel 11 is journaled in enlargements of walls of the chamber 6, and carries two upright pinions 12 for driving the upright pump or load rod 13. Upright transmission gears 14 are in mesh with pinions 12 and are journaled within a bearing 15 carried by the head 4. Pitmen 16 connect gears 14 with the upper end of load rod 13. A stirrup 17 is fixed upon the upper end of the load rod and carries bearings in which a shaft 18 turns. The outer ends of this shaft are in fixed connection with the upper ends of the pitmen 16 whereby the pitmen are maintained in proper inter-relation without relying upon a guide structure to perform this function. The gears and pitmen are equidistant from a plane parallel to the gears and which plane includes the axis of the load shaft, whereby the driving force upon the load rod is evenly distributed. The head 4 carries an upright stirrup 19 whose parallel branches constitute upright guides that are simultaneously received in the groove of an anti-friction wheel or roller 20 that turns on and with respect to the shaft 18. Said roller is permitted very slight bodily movement in the plane of the stirrup 19 so that it may have rolling engagement with but one vertical branch of the stirrup 19 at a time. The friction which is thus reduced may be still further reduced if the vertical guides do not have to take part in maintaining the pitmen in proper inter-relation, a function which is avoided if the shaft 18 is in rigid relation to the pitmen, as hitherto described. The threaded stem termination 21 of stirrup 19 passes through the top plate 22 of hood 7 whereby a nut 23 may clamp the hood in place.

While I have herein shown and particularly described the preferred embodiment of my invention I do not wish to be limited to the precise details of construction shown as changes may readily be made without departing from the spirit of my invention, but

Having thus described my invention I claim as new and desire to secure by Letters Patent the following:—

1. Power transmission mechanism including a motor; a reciprocating upright load rod; gearing driven by the motor and including two upright gears substantially equi-distant from a plane parallel thereto that includes the load rod axis; pitmen connecting said gears with the upper end of the load rod; a guiding roller connected with the load rod; and a pair of upright guides in the plane of the roller and between which the roller is disposed and which guides are spaced apart a distance greater than the diameter of the portion of the roller intervening between the inner sides of said guides to permit the roller to have rolling action upon but one of the guides at a time, said guide roller having a groove which receives both guides at the same time.

2. Power transmission mechanism including a motor; a reciprocating upright load rod; gearing driven by the motor and including two upright gears substantially equi-distant from a plane parallel thereto that includes the load rod axis; pitmen connecting said gears with the upper end of the load rod; a guiding roller connected with the load rod; and a pair of upright guides in the plane of the roller and between which the roller is disposed and which guides are spaced apart a distance greater than the diameter of the portion of the roller intervening between the inner sides of said guides sufficiently to permit the roller to have rolling action upon but one of the guides at a time.

In witness whereof, I hereunto subscribe my name this 3rd day of September A. D., 1914.

LA VERNE W. NOYES.

Witnesses:
D. R. SCHOLES,
FREDERICK L. DOLE.